United States Patent
Lee

(10) Patent No.: US 11,240,842 B2
(45) Date of Patent: Feb. 1, 2022

(54) DEVICE AND METHOD OF HANDLING TRANSMISSION/RECEPTION FOR SERVING CELL

(71) Applicant: ACER INCORPORATED, New Taipei (TW)

(72) Inventor: Chien-Min Lee, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 58 days.

(21) Appl. No.: 15/397,688

(22) Filed: Jan. 3, 2017

(65) Prior Publication Data

US 2017/0202021 A1  Jul. 13, 2017

Related U.S. Application Data

(60) Provisional application No. 62/276,240, filed on Jan. 8, 2016.

(51) Int. Cl.
*H04W 74/08* (2009.01)
*H04L 5/00* (2006.01)
*H04L 25/02* (2006.01)
*H04W 72/04* (2009.01)
(Continued)

(52) U.S. Cl.
CPC ......... *H04W 74/0816* (2013.01); *H04L 5/001* (2013.01); *H04L 5/0053* (2013.01); *H04L 5/0092* (2013.01); *H04L 25/0226* (2013.01); *H04W 72/0413* (2013.01); *H04W 72/0453* (2013.01); *H04L 5/0048* (2013.01);
(Continued)

(58) Field of Classification Search
CPC ............. H04W 16/14; H04W 74/0808; H04W 72/0446; H04W 72/0453; H04W 72/0413; H04W 74/0816; H04W 72/04; H04W 72/1268; H04W 72/1284; H04W 74/004
See application file for complete search history.

(56) References Cited

U.S. PATENT DOCUMENTS

| | | | |
|---|---|---|---|
| 2010/0195604 A1* | 8/2010 | Papasakellariou | .... H04L 1/1893 370/329 |
| 2011/0085516 A1* | 4/2011 | Pajukoski | ............... H04L 5/001 370/330 |
| 2011/0098054 A1 | 4/2011 | Gorokhov | |

(Continued)

FOREIGN PATENT DOCUMENTS

CN  101383665 A  3/2009

OTHER PUBLICATIONS

3GPP TS 36.213 V12.7.0 (Oct. 2015) pp. 74, 85, 102, 135 (Year: 2015).*

(Continued)

*Primary Examiner* — Un C Cho
*Assistant Examiner* — Yu-Wen Chang
(74) *Attorney, Agent, or Firm* — Winston Hsu

(57) ABSTRACT

A communication device for handling transmission/reception for a serving cell comprises a storage unit for storing instructions and a processing circuit coupled to the storage unit. The processing circuit is configured to execute the instructions stored in the storage unit. The instructions comprise receiving an indication indicating at least one subband unit of a serving cell from a network; and performing a communication operation in the at least one subband unit with the network, after receiving the indication.

12 Claims, 12 Drawing Sheets

(51) Int. Cl.
*H04L 27/00* (2006.01)
*H04W 88/02* (2009.01)

(52) U.S. Cl.
CPC ..... *H04L 27/0006* (2013.01); *H04W 74/0808* (2013.01); *H04W 88/02* (2013.01)

(56) References Cited

U.S. PATENT DOCUMENTS

| | | |
|---|---|---|
| 2011/0268028 A1 | 11/2011 | Stern-Berkowitz |
| 2012/0113827 A1 | 5/2012 | Yamada |
| 2012/0147773 A1 | 6/2012 | Kim |
| 2012/0165032 A1* | 6/2012 | Park ............... H04W 52/143 455/452.1 |
| 2012/0218968 A1 | 8/2012 | Kim |
| 2013/0070623 A1 | 3/2013 | Chun |
| 2013/0107116 A1* | 5/2013 | Charbit ............... H04L 5/003 348/388.1 |
| 2013/0322279 A1 | 12/2013 | Chincholi |
| 2013/0336214 A1 | 12/2013 | Sayana |
| 2014/0036853 A1 | 2/2014 | Kim |
| 2014/0135055 A1* | 5/2014 | Fu ............... H04W 52/146 455/522 |
| 2014/0328302 A1 | 11/2014 | Park |
| 2015/0092702 A1* | 4/2015 | Chen ............... H04W 72/082 370/329 |
| 2015/0358924 A1* | 12/2015 | Papasakellariou ............... H04W 72/0406 370/329 |
| 2016/0073344 A1* | 3/2016 | Vutukuri ........... H04W 52/0216 370/252 |
| 2016/0088594 A1* | 3/2016 | Xiong ............... H04W 4/70 370/329 |
| 2017/0163388 A1* | 6/2017 | Wiemann ........... H04W 72/0413 |
| 2018/0013529 A1* | 1/2018 | You ............... H04L 5/00 |
| 2018/0048498 A1* | 2/2018 | Stern-Berkowitz ............... H04L 5/0048 |
| 2018/0115983 A1* | 4/2018 | Harada ............... H04J 11/00 |
| 2018/0198568 A1* | 7/2018 | Takeda ............... H04L 5/0051 |
| 2018/0288787 A1* | 10/2018 | Hooli ............... H04L 27/0006 |
| 2018/0359072 A1* | 12/2018 | Tiirola ............... H04L 1/1812 |

OTHER PUBLICATIONS

Nokia Networks, On the PHY options for LAA UL operation, 3GPP TSG-RAN WG1 Meeting #80bis, Apr. 20-24, 2015, R1-151841, XP050934701, Belgrade, Serbia.

Zte, UL framework for LAA, 3GPP TSG RAN WG1 Meeting#83, Nov. 15-22, 2015, pp. 1-6, R1-156994, XP051003305, Anaheim, USA.

Qualcomm Incorporated, Remaining details of UL LBT operation, 3GPP TSG RAN WG1 #83, Nov. 14-22, 2015, p. 1/3-3/3, R1-157037, XP051003340, Anaheim, USA.

\* cited by examiner

DEVICE AND METHOD OF HANDLING TRANSMISSION/RECEPTION FOR SERVING CELL

CROSS REFERENCE TO RELATED APPLICATIONS

This application claims the benefit of U.S. Provisional Application No. 62/276,240 filed on Jan. 8, 2016, which is incorporated herein by reference.

BACKGROUND OF THE INVENTION

1. Field of the Invention

The present invention relates to a communication device and a method used in a wireless communication system, and more particularly, to a communication device and a method of handling transmission/reception for a serving cell in a wireless communication system.

2. Description of the Prior Art

A long-term evolution (LTE) system supporting the 3rd Generation Partnership Project (3GPP) Rel-8 standard and/or the 3GPP Rel-9 standard are developed by the 3GPP as a successor of the universal mobile telecommunication system (UMTS) for further enhancing performance of the UMTS to satisfy increasing needs of users. The LTE system includes a new radio interface and a new radio network architecture that provides high data rate, low latency, packet optimization, and improved system capacity and coverage. In the LTE system, a radio access network known as an evolved universal terrestrial radio access network (E-UTRAN) includes at least one evolved Node-B (eNB) for communicating with at least one user equipment (UE), and for communicating with a core network including a mobility management entity (MME), a serving gateway, etc., for Non-Access Stratum (NAS) control.

A LTE-advanced (LTE-A) system, as its name implies, is an evolution of the LTE system. The LTE-A system targets faster switching between power states, improves performance at the coverage edge of an eNB, increases peak data rate and throughput, and includes advanced techniques, such as carrier aggregation (CA), coordinated multipoint (CoMP) transmissions/reception, uplink (UL) multiple-input multiple-output (UL-MIMO), licensed-assisted access (LAA) using LTE, etc. For a UE and an eNB to communicate with each other in the LTE-A system, the UE and the eNB must support standards developed for the LTE-A system, such as the 3GPP Rel-10 standard or later versions.

Network operators propose to offload network traffic of the LTE/LTE-A system to a serving cell (e.g., licensed serving cell and/or unlicensed serving cell), to ease load of the network traffic. For example, the eNB may provide services to the UE via both a licensed serving cell and an unlicensed serving cell. Alternatively, the services are provided by eNBs to the UE via both the licensed serving cell and the unlicensed serving cell. However, it is difficult for the UE to transmit UL control information to the eNB due to uncertainty of available resource of the unlicensed serving cell of the eNB while a timing requirement of the UL control information should be satisfied. Accordingly, the UL control information may be transmitted to the eNB with an excessive delay. Benefit of the unlicensed serving cell is reduced. Thus, transmission/reception for the serving cell is an important problem to be solved.

SUMMARY OF THE INVENTION

The present invention therefore provides a method and related communication device for handling transmission/reception for a serving cell to solve the abovementioned problem.

A communication device for handling transmission/reception for a serving cell comprises a storage unit for storing instructions and a processing circuit coupled to the storage unit. The processing circuit is configured to execute the instructions stored in the storage unit. The instructions comprise receiving an indication indicating at least one subband unit of a serving cell from a network; and performing a communication operation in the at least one subband unit with the network, after receiving the indication.

A communication device for handling transmission/reception for a serving cell comprises a storage unit for storing instructions and a processing circuit coupled to the storage unit. The processing circuit is configured to execute the instructions stored in the storage unit. The instructions comprise transmitting a physical UL shared channel (PUSCH) in a first subband unit of a serving cell to a network; and transmitting a physical UL control channel (PUCCH) accompanied with the PUSCH via the serving cell to the network according to a multiplexing scheme.

A communication device for handling transmission/reception for a serving cell comprises a storage unit for storing instructions and a processing circuit coupled to the storage unit. The processing circuit is configured to execute the instructions stored in the storage unit. The instructions comprise transmitting a sounding reference signal (SRS) in a first time period of at least one first subband unit of a serving cell in a time interval to a network; and transmitting a physical UL shared channel (PUSCH) in a second time period of at least one second subband unit of the serving cell in the time interval to the network, wherein the second time period is after the first time period.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
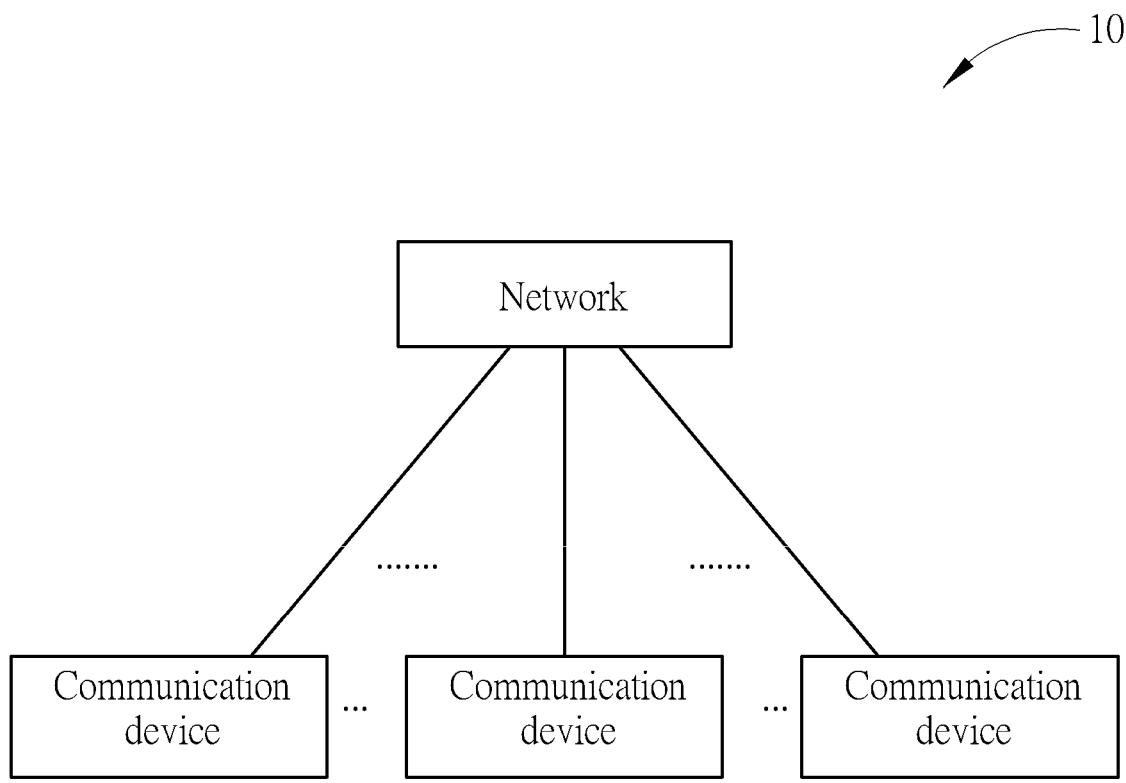
FIG. 1 is a schematic diagram of a wireless communication system according to an example of the present invention.

Please refer to FIG. 1, which is a schematic diagram of a wireless communication system 10 according to an example of the present invention. The wireless communication system 10 is briefly composed of a network and a plurality of communication devices. The wireless communication system 10 may support a time-division duplexing (TDD) mode, a frequency-division duplexing (FDD) mode, a TDD-FDD joint operation mode or a licensed-assisted access (LAA) mode. That is, the network and a communication device may communicate with each other via FDD carrier(s), TDD carrier(s), licensed carrier(s) (licensed serving cell(s)) and/or unlicensed carrier(s) (unlicensed serving cell(s)). In addition, the wireless communication system 10 may support a carrier aggregation (CA). That is, the network and a communication device may communicate with each other via multiple serving cells (e.g., multiple serving carriers) including a primary cell (e.g., primary component carrier) and one or more secondary cells (e.g., secondary component carriers).

In FIG. 1, the network and the communication devices are simply utilized for illustrating the structure of the wireless communication system 10. Practically, the network may be a universal terrestrial radio access network (UTRAN) including at least one Node-B (NB) in a universal mobile telecommunications system (UMTS). In another example, the network may be an evolved UTRAN (E-UTRAN) including at least one evolved NB (eNB) and/or at least one relay in a long term evolution (LTE) system, a LTE-Advanced (LTE-A) system or an evolution of the LTE-A system.

Furthermore, the network may also include both the UTRAN/E-UTRAN and a core network, wherein the core network may include network entities such as Mobility Management Entity (MME), Serving Gateway (S-GW), Packet Data Network (PDN) Gateway (P-GW), Self-Organizing Networks (SON) server and/or Radio Network Controller (RNC), etc. In other words, after the network receives information transmitted by a communication device, the information may be processed only by the UTRAN/E-UTRAN and decisions corresponding to the information are made at the UTRAN/E-UTRAN. Alternatively, the UTRAN/E-UTRAN may forward the information to the core network, and the decisions corresponding to the information are made at the core network after the core network processes the information. In addition, the information may be processed by both the UTRAN/E-UTRAN and the core network, and the decisions are made after coordination and/or cooperation are performed by the UTRAN/E-UTRAN and the core network.

A communication device may be a user equipment (UE), a low cost device (e.g., machine type communication (MTC) device), a device-to-device (D2D) communication device, a mobile phone, a laptop, a tablet computer, an electronic book, a portable computer system, or combination thereof. In addition, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

Figure 2:
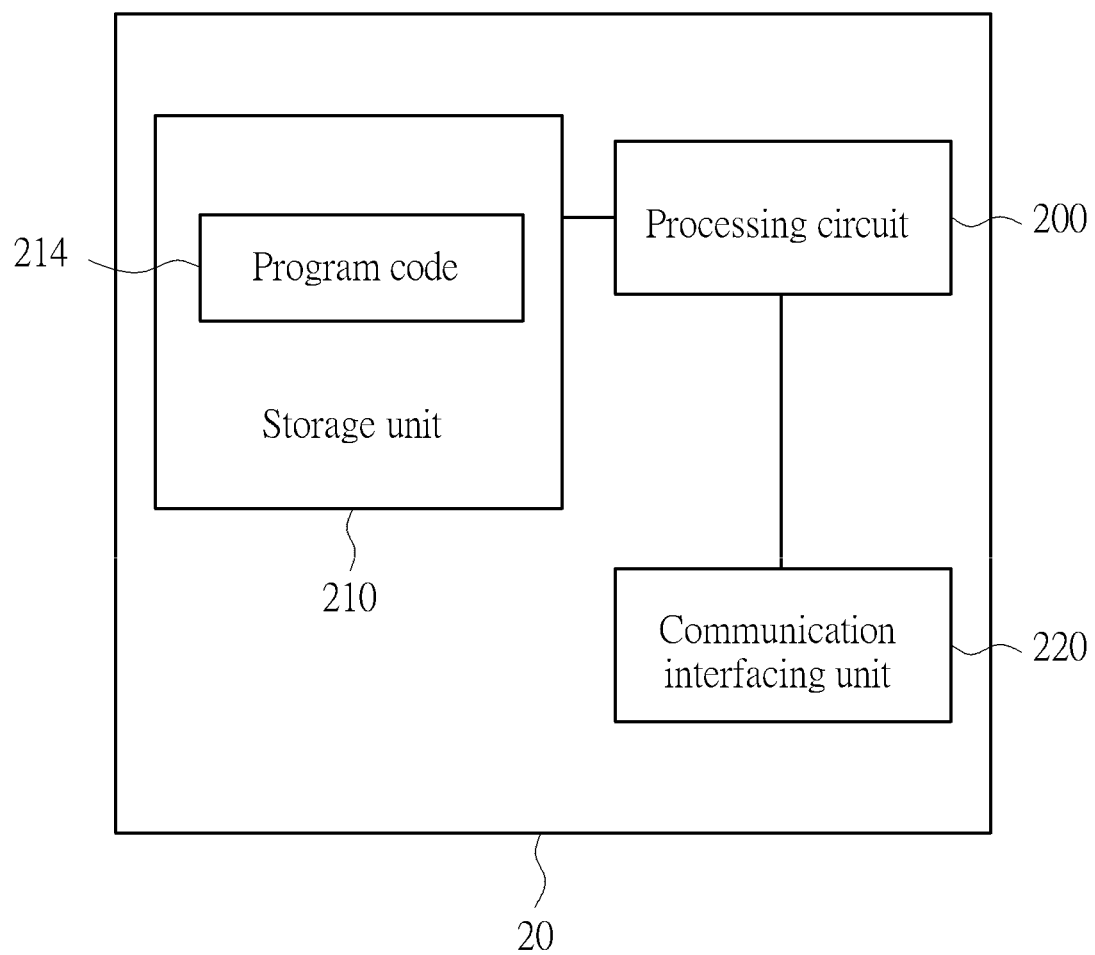
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein. The communication device 20 may include a processing circuit 200 such as a microprocessor or Application Specific Integrated Circuit (ASIC), a storage unit 210 and a communication interfacing unit 220. The storage unit 210 may be any data storage device that may store a program code 214, accessed and executed by the processing circuit 200. Examples of the storage unit 210 include but are not limited to a subscriber identity module (SIM), read-only memory (ROM), flash memory, random-access memory (RAM), Compact Disc Read-Only Memory (CD-ROM), digital versatile disc-ROM (DVD-ROM), Blu-ray Disc-ROM (BD-ROM), magnetic tape, hard disk, optical data storage device, non-volatile storage unit, non-transitory computer-readable medium (e.g., tangible media), etc. The communication interfacing unit 220 is preferably a transceiver and is used to transmit and receive signals (e.g., data, messages and/or packets) according to processing results of the processing circuit 200.

Figure 3:
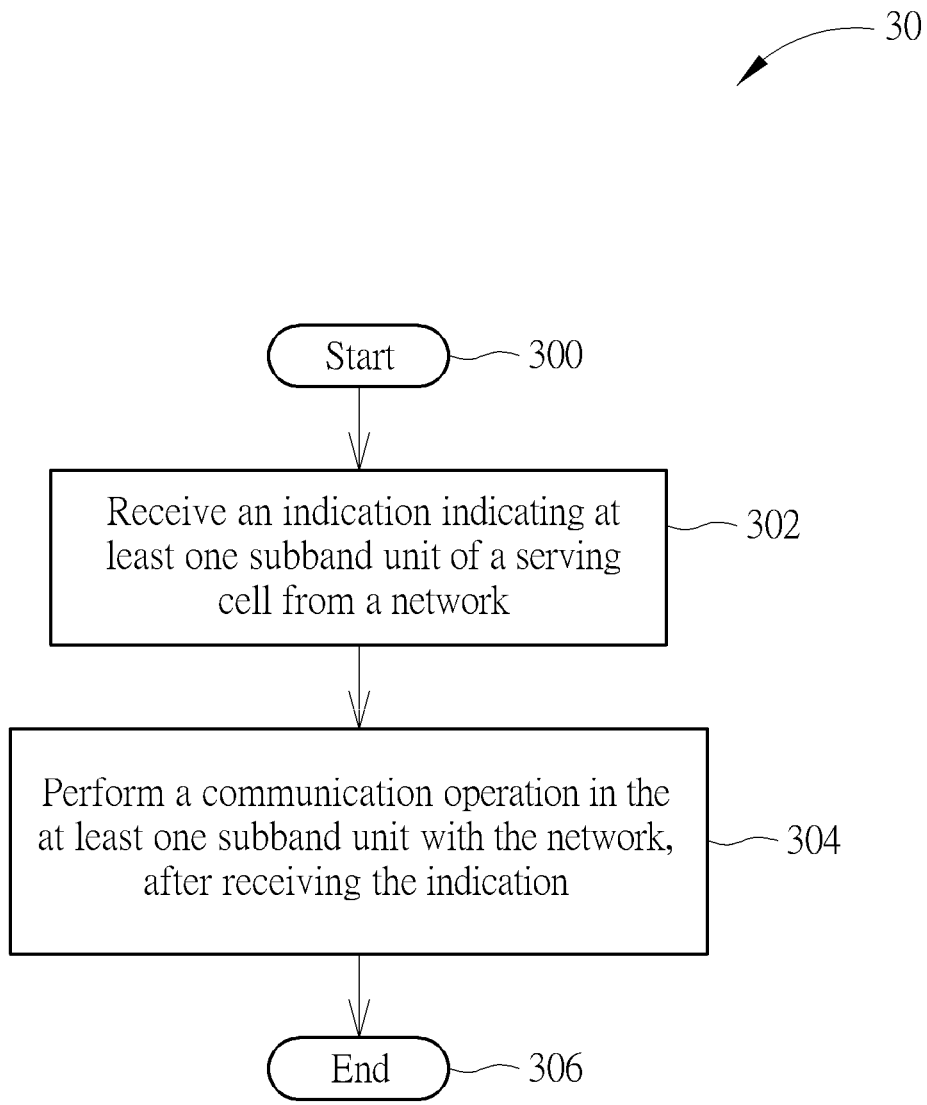
FIG. 3 is a flowchart of a process according to an example of the present invention.

FIG. 3 is a flowchart of a process 30 according to an example of the present invention. The process 30 may be utilized in a communication device shown in FIG. 1, to handle transmission/reception for a serving cell. The process 30 may be compiled into the program code 214 and includes the following steps:

Step 300: Start.

Step 302: Receive an indication indicating at least one subband unit of a serving cell from a network.

Step 304: Perform a communication operation in the at least one subband unit with the network, after receiving the indication.

Step 306: End.

According to the process 30, the communication device may receive an indication indicating at least one subband unit of a serving cell (e.g., UL licensed serving cell, DL licensed serving cell, UL unlicensed serving cell and/or DL unlicensed serving cell) from a network. Then, the communication device may perform a communication operation in the at least one subband unit with the network, after receiving the indication. That is, subband unit(s) for performing the communication operation is indicated by the network to the communication device. Correspondingly, the network transmits the indication indicating the at least one subband unit to the communication device, and performs the communication operation in the at least one subband unit with the communication device. Thus, use of the subband unit(s) for the serving cell is solved according to the process 30.

Realization of the process 30 is not limited to the above description. The following examples may be applied for realizing the process 30.

In one example, the communication operation may include a listen before talk (LBT) performed in a first set of the at least one subband unit. Further, the communication device may transmit data and/or control information via the first set of the at least one subband unit to the network according a result of the LBT. For example, the communication device transmits the data and/or the control information, if the result of the LBT indicates that the first set of the at least one subband unit is clear. Otherwise, the communication device stops transmitting the data and/or the control information.

In one example, the communication operation may include a measurement performed in a second set of the at least one subband unit. Further, the communication device may perform a LBT in a third set of the at least one subband unit, and may transmit a measurement result of the measurement via the third set of the at least one subband unit according to a result of the LBT. For example, the communication device transmits the measurement result, if the result of the LBT indicates that the third set of the at least one subband unit is clear. Otherwise, the communication device stops transmitting the measurement result. In one example, the measurement result may include a LBT successful rate (or failure rate) of the third set of the at least one subband unit. That is, more information is provided to the network, for the network to make a better scheduling decision for the communication device.

In one example, a location of the at least one subband unit may be determined according to a bandwidth of the serving cell, or may be determined according to a higher layer signaling transmitted by the network. Similarly, a bandwidth of the at least one subband unit may be determined according to the bandwidth of the serving cell, or may be determined according to a higher layer signaling transmitted by the network. In one example, each of the at least one subband unit may include a plurality of physical resource blocks (PRBs).

It should be noted that, the first set of the at least one subband unit, the second set of the at least one subband unit and/or the third set of the at least one subband unit may be overlapped (e.g., partly overlapped or completely overlapped). For example, the first set of the at least one subband unit and the second set of the at least one subband unit may be the same. In another example, the first set of the at least one subband unit, the second set of the at least one subband unit and the third set of the at least one subband unit may not be overlapped.

Figure 4:
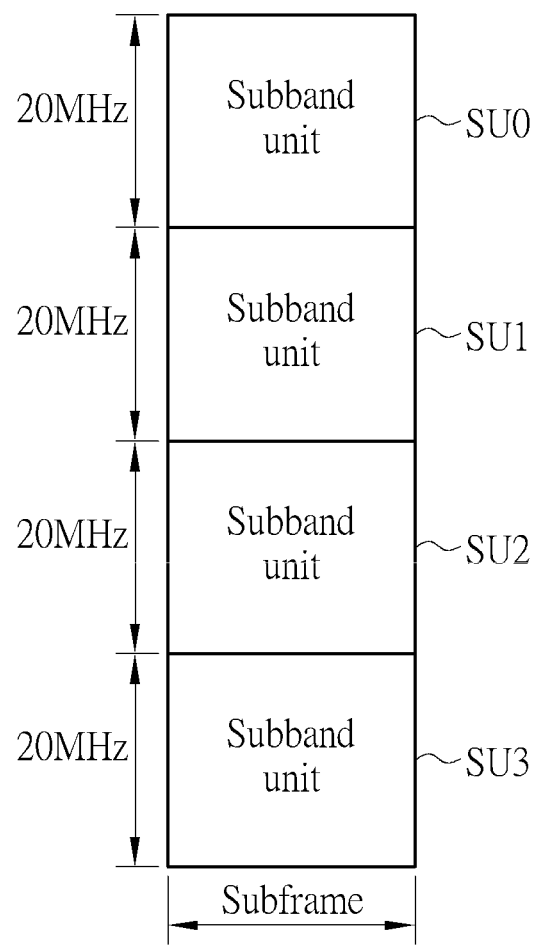
FIG. 4 is a schematic diagram of arrangement of subband units according to an example of the present invention.

FIG. 4 is a schematic diagram of arrangement of subband units according to an example of the present invention. There are 4 subband units SU0-SU3 in an unlicensed serving cell, a bandwidth of each of the subband units SU0-SU3 is 20 MHz, and a time width of each of the subband units SU0-SU3 is a subframe (or other time unit such as a time slot or a time interval, etc.). According to the present invention, the communication device receives an indication indicating the subband units SU0-SU2 transmitted by the network. Then, the communication device may perform a communication operation in one or more of the subband units SU0-SU2. For example, the communication device may perform a LBT in the subband units SU0-SU1, and may perform a measurement in the subband units SU1-SU2 to obtain a measurement result when performing the LBT. Accordingly, the communication device may transmit the measurement result including power status of the subband units SU1-SU2 via the subband unit SU1 to the network according a result of the LBT. As can be seen, a range where the measurement is performed may be different from (but partly overlapped with) a range where the LBT is performed, i.e., a neighboring subband unit is measured. In addition, the communication device may transmit data and/or control information via the subband units SU0-SU1 to the network according to the result of the LBT.

Figure 5:
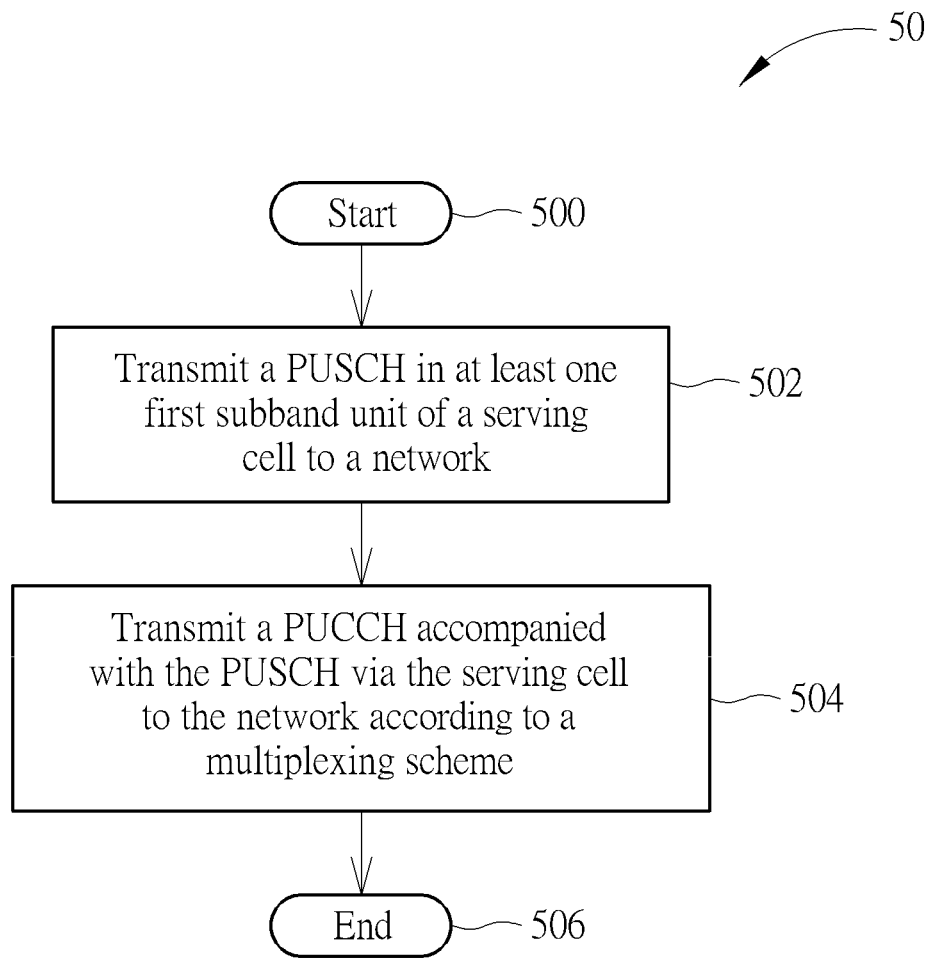
FIG. 5 is a flowchart of a process according to an example of the present invention.

FIG. 5 is a flowchart of a process 50 according to an example of the present invention. The process 50 may be utilized in a communication device shown in FIG. 1, to handle transmission/reception for a serving cell. The process 50 may be compiled into the program code 214 and includes the following steps:

Step 500: Start.

Step 502: Transmit a physical UL shared channel (PUSCH) in at least one first subband unit of a serving cell to a network.

Step 504: Transmit a physical UL control channel (PUCCH) accompanied with the PUSCH via the serving cell to the network according to a multiplexing scheme.

Step 506: End.

According to the process 50, the communication device may transmit a PUSCH in at least one first subband unit of a serving cell (e.g., UL licensed serving cell, DL licensed serving cell, UL unlicensed serving cell and/or DL unlicensed serving cell) to a network. Then, the communication device may transmit a PUCCH accompanied with the PUSCH via the serving cell to the network according to a multiplexing scheme. That is, the PUSCH and the PUCCH are multiplexed in the at least one subband unit, and are transmitted jointly to the network. In other words, a method for transmitting the PUSCH and the PUCCH is provided for the serving cell. Thus, the problem of transmitting the UL control information (UCI) via the serving cell is solved.

Realization of the process 50 is not limited to the above description. The following examples may be applied for realizing the process 50.

In one example, the multiplexing scheme may be a frequency-division multiplexing (FDM) scheme, and the PUCCH may be transmitted in at least one second subband unit of the serving cell. Further, the at least one first subband unit may be adjacent to the at least one second subband unit in a frequency domain. In one example, the multiplexing scheme may be a time-division multiplexing (TDM) scheme, and the PUSCH may be transmitted in the at least one first subband unit before the PUCCH. In one example, the multiplexing scheme may be a TDM scheme, and the PUSCH may be transmitted in the at least one first subband unit after the PUCCH. In one example, the PUCCH may be configured with a PUCCH format. For example, the PUCCH format may be a PUCCH format 1, 2 or 3.

In one example, a location of the at least one first subband unit (or the at least one second subband unit) may be determined according to a bandwidth of the serving cell, or may be determined according to a higher layer signaling transmitted by the network. Similarly, a bandwidth of the at least one first subband unit (or the at least one second subband unit) may be determined according to the bandwidth of the serving cell, or may be determined according to a higher layer signaling transmitted by the network. In one example, each of the at least one first subband unit (or the at least one second subband unit) may include a plurality of PRBs.

Figure 6:
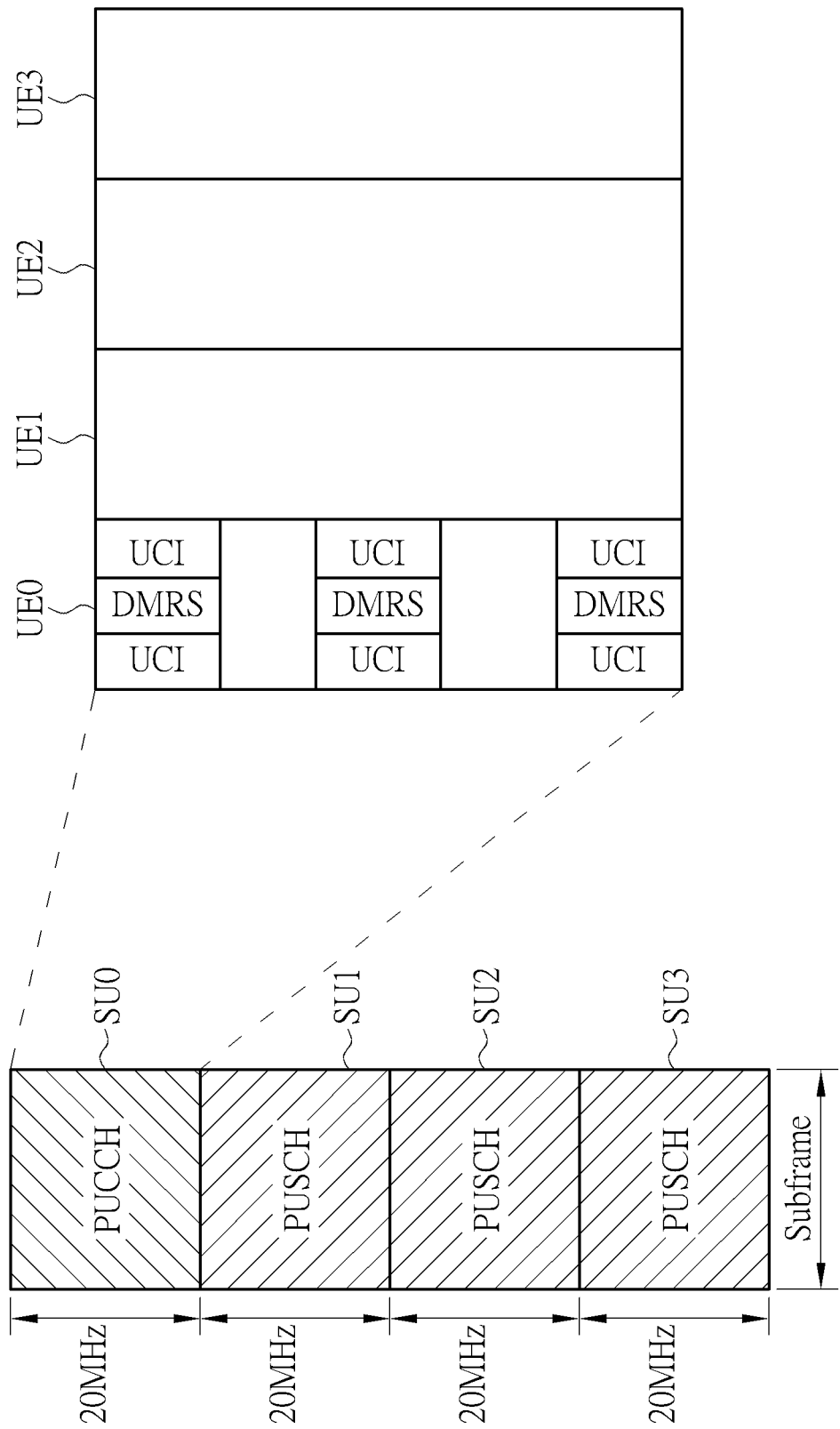
FIG. 6 is a schematic diagram of arrangement of subband units according to an example of the present invention.

FIG. 6 is a schematic diagram of arrangement of subband units according to an example of the present invention. There are 4 subband units SU0-SU3 in an unlicensed serving cell, a bandwidth of each of the subband units SU0-SU3 is 20 MHz, and a time width of each of the subband units SU0-SU3 is a subframe (or other time unit such as a time slot or a time interval, etc.). A PUCCH is transmitted in the subband unit SU0, and PUSCHs are transmitted in the subband units SU1-SU3. That is, the PUCCH and the PUSCHs are transmitted according to the FDM scheme. PUCCH regions of UEs UE0-UE3 configured with various PUCCH formats are multiplexed in the PUCCH according the TDM scheme. In another example, the FDM scheme and/or a code-division multiplexing (CDM) scheme may be used for multiplexing the PUCCH regions of the UEs UE0-UE3. The PUCCH may be termed as a long duration PUCCH, when the FDM scheme is used. As shown in FIG. 6, the UE UE0 may transmit the UCI and a demodulation reference signal (DMRS) in a PUCCH region of the PUCCH with a PUCCH format. The PUCCH may be termed as a short duration PUCCH in this situation. Similarly, the UEs UE1-UE3 may transmit the UCI and the DMRS in corresponding PUCCH regions of the PUCCH with corresponding PUCCH formats. It should be noted that one or more of the subband units SU0-SU3 may not be used for transmitting the corresponding PUSCH and/or the corresponding PUCCH, if a result of a LBT indicates that the one or more of the subband units SU1-SU3 is not clear. That is, the transmission(s) may be performed according to the result of the LBT performed in the subband unit(s).

Figure 7:
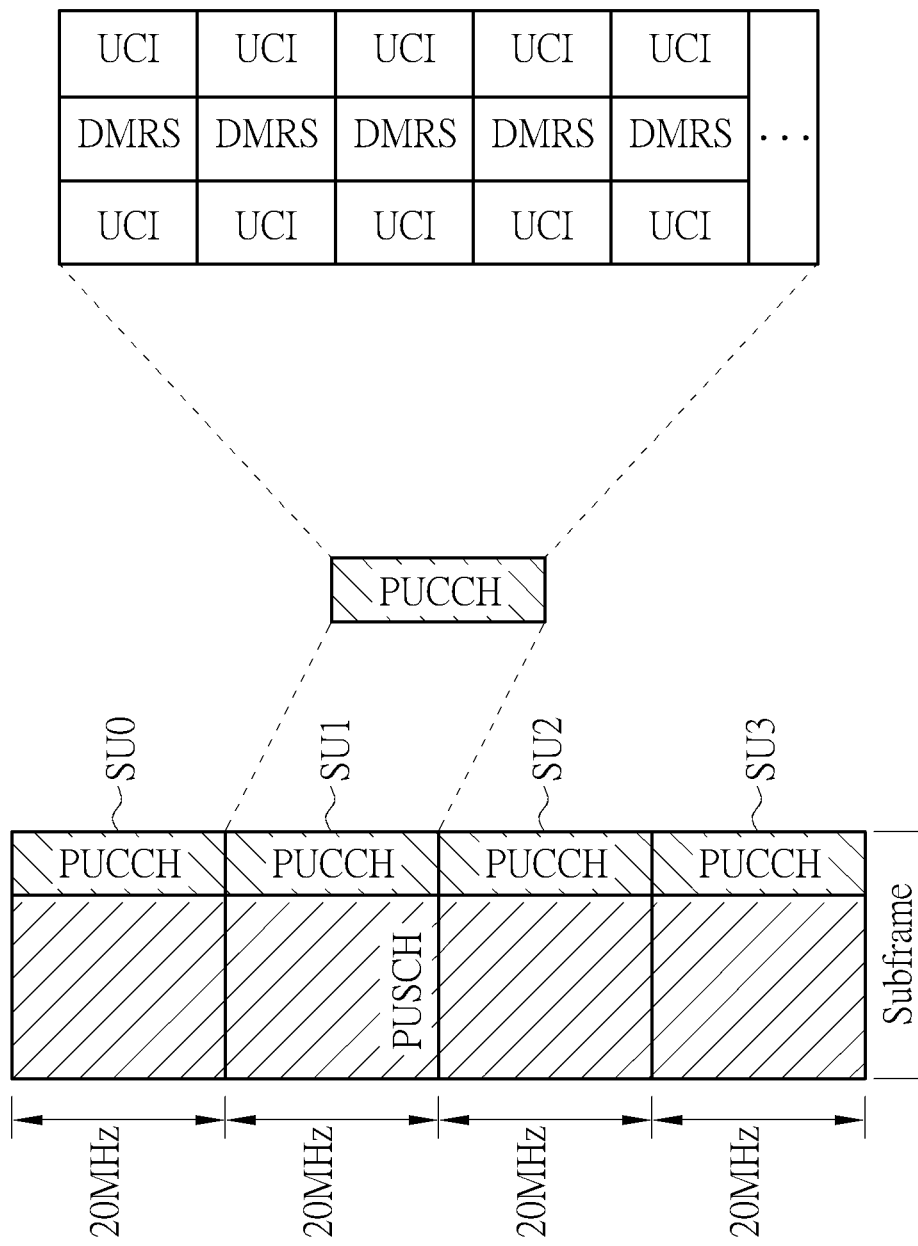
FIG. 7 is a schematic diagram of arrangement of subband units according to an example of the present invention.

FIG. 7 is a schematic diagram of arrangement of subband units according to an example of the present invention. There are 4 subband units SU0-SU3 in an unlicensed serving cell, a bandwidth of each of the subband units SU0-SU3 is 20 MHz, and a time width of each of the subband units SU0-SU3 is a subframe (or other time unit such as a time slot or a time interval, etc.). PUSCHs of UEs UE0-UE3 configured with various PUCCH formats are transmitted in PUSCHs of the subband units SU0-SU3, respectively. More specifically, the PUCCH and the PUSCHs are transmitted according to the TDM scheme. The PUSCHs are transmitted in the corresponding subband unit before the PUSCHs. As shown in FIG. 7, the UE UE1 may transmit the UCI and a DMRS in a PUCCH region of the PUCCH with a PUCCH format. Similarly, the UEs UE0 and the UEs UE2-UE3 may transmit the UCI and the DMRS in corresponding PUCCHs with corresponding PUCCH formats. The present example can be applied to the case where each PUSCH is transmitted in a corresponding subband unit after a corresponding PUCCH. The UCIs of multiple UEs may be transmitted in a PUCCH, when a CDM scheme is used. It should be noted that one or more of the subband units SU0-SU3 may not be used for transmitting the corresponding PUSCH and/or the corresponding PUCCH, if a result of a LBT indicates that the one or more of the subband units SU1-SU3 is not clear. That is, the transmission(s) may be performed according to the result of the LBT performed in the subband unit(s).

Figure 8:
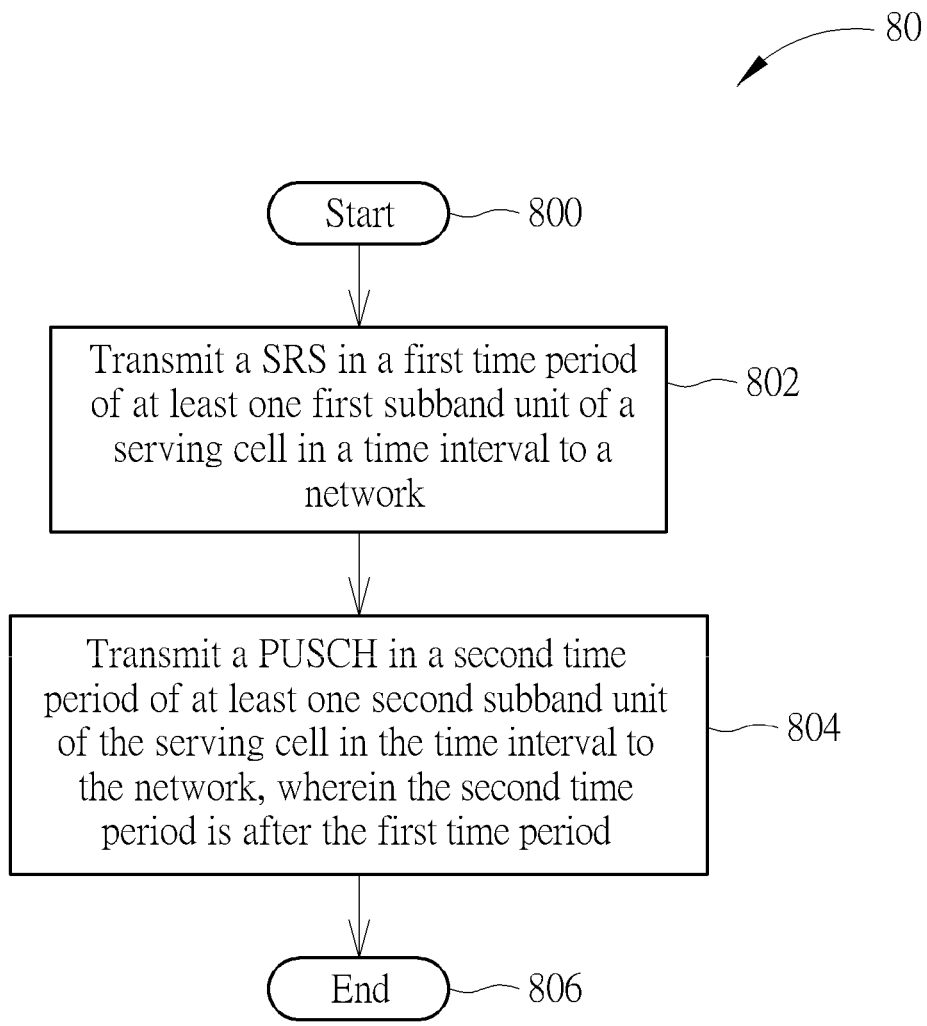
FIG. 8 is a flowchart of a process 80 according to an example of the present invention.

FIG. 8 is a flowchart of a process 80 according to an example of the present invention. The process 80 may be utilized in a communication device shown in FIG. 1, to handle transmission/reception for a serving cell. The process 80 may be compiled into the program code 214 and includes the following steps:

Step 800: Start.

Step 802: Transmit a sounding reference signal (SRS) in a first time period of at least one first subband unit of a serving cell in a time interval to a network.

Step 804: Transmit a PUSCH in a second time period of at least one second subband unit of the serving cell in the time interval to the network, wherein the second time period is after the first time period.

Step 806: End.

According to the process 80, the communication device may transmit a SRS in a first time period of at least one first subband unit of a serving cell (or other time unit such as a time slot or a time interval, etc.) in a time interval to a network. In addition, the communication device may transmit a PUSCH in a second time period of at least one second subband unit of the serving cell in the time interval to the network, wherein the second time period is after the first time period. That is, the SRS is transmitted before the PUSCH in the same or different subband unit(s) in the time interval. Correspondingly, the network receives the SRS in the first time period of the at least one first subband unit of the serving cell in the time interval from the communication device, and receives the PUSCH in the second time period of the at least one second subband unit of the serving cell in the time interval from the communication device. Thus, the problem of the transmission of the SRS and the PUSCH via the serving cell is solved.

Realization of the process 80 is not limited to the above description. The following examples may be applied for realizing the process 80.

In one example, a length of the time interval and a time width of one of the at least one first subband unit are the same. That is, the time interval is a time width of a subband unit. In one example, the at least one first subband unit and the at least one second subband unit may be overlapped. In another example, the at least one first subband unit and the at least one second subband unit may not be overlapped. In one example, the communication device may perform a LBT in at least one third subband unit of the serving cell, before transmitting the SRS. Then, the communication device may transmit the SRS to the network according a result of the LBT. Preferably, the at least one third subband unit covers all or part of the at least one first subband unit. That is, the communication device transmits the SRS, if the result of the LBT indicates that the at least one first subband unit is clear. Otherwise, the communication device stops transmitting the SRS.

In one example, a time gap may be between the first time period and the second time period. Further, the time gap may be generated according to a puncturing operation of the SRS. That is, the SRS may be punctured to generate the time gap. In one example, the SRS may include at least one SRS transmitted in the at least one first subband unit, respectively. That is, in each of the at least one first subband unit, a corresponding SRS (i.e., shortened SRS) is transmitted, to prevent a situation where part of the at least one first subband unit is not used.

In one example, the communication device may transmit a PUCCH in a third time period of at least one third subband unit of the serving cell in the time interval to the network. That is, the SRS, the PUSCH and the PUCCH may be transmitted (i.e., multiplexed) jointly via the serving cell. There are various way of transmitting (i.e., multiplexing) the SRS, the PUSCH and the PUCCH jointly via the serving cell. For example, the third time period may be after the second time period. In one example, the third time period may be before the first time period. In one example, a length of the third time period may be a sum of a length of the first time period and a length of the second time period. In one example, a length of the third time period and a length of the second time period may be the same. Correspondingly, the network receives the PUCCH in the third time period of the at least one third subband unit of the serving cell in the time interval from the communication device.

In one example, a location of the at least one first subband unit and/or a location of the at least one second subband unit may be determined according to a bandwidth of the serving cell, or may be determined according to a higher layer signaling transmitted by the network. Similarly, a bandwidth of the at least one subband unit and/or a bandwidth of the at least one second subband unit may be determined according to the bandwidth of the serving cell, or may be determined according to a higher layer signaling transmitted by the network. In one example, each of the at least one first subband unit may include a first plurality of PRBs, and/or the at least one second subband unit may include a second plurality of PRBs.

Figure 9:
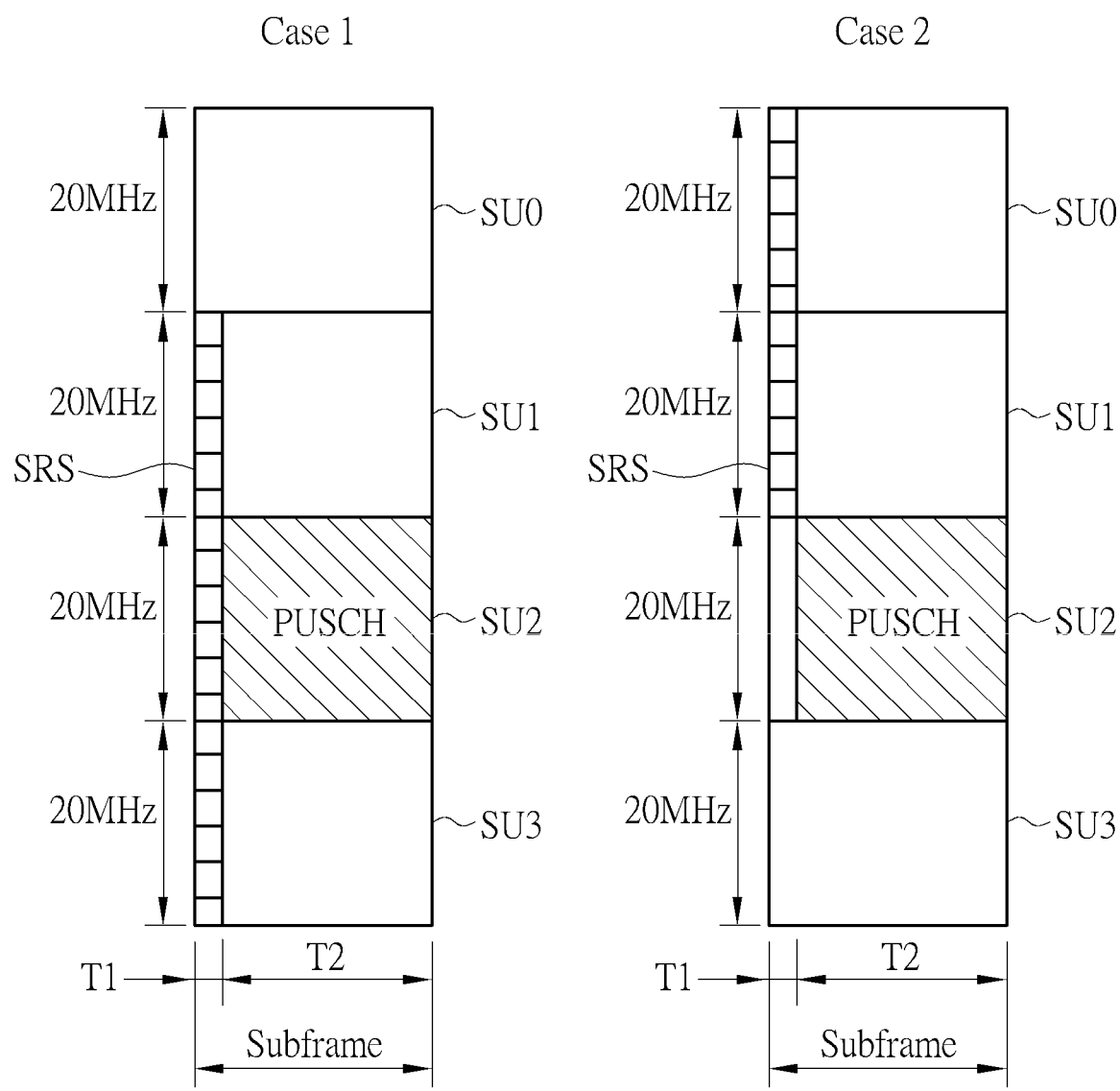
FIG. 9 is a schematic diagram of arrangement of subband units according to an example of the present invention.

FIG. 9 is a schematic diagram of arrangement of subband units according to an example of the present invention.

There are 4 subband units SU0-SU3 in an unlicensed serving cell, a bandwidth of each of the subband units SU0-SU3 is 20 MHz, and a time width of each of the subband units SU0-SU3 is a subframe (or other time unit such as a time slot or a time interval, etc.). Two cases Case 1 and Case 2 are illustrated as follows. In Case 1, the communication device transmits a SRS in a time period T1 of the subband units SU1-SU3 in the subframe to the network. In addition, the communication device transmits a PUSCH in a time period T2 of the subband unit SU2 in the subframe to the network, wherein the time period T2 is after the time period T1. In Case 1, the subband units for transmitting the SRS and the subband unit for transmitting the PUSCH are overlapped. Case 2 is similar to Case 1 except that the SRS is transmitted in the time period T1 of the subband units SU0-SU1. That is, the subband units for transmitting the SRS and the subband unit for transmitting the PUSCH are not overlapped. It should be noted that one or more of the subband units SU0-SU3 may not be used for transmitting the corresponding SRS and/or the corresponding PUSCH, if a result of a LBT indicates that the one or more of the subband units SU1-SU3 is not clear. That is, the transmission(s) may be performed according to the result of the LBT performed in the subband unit(s).

Figure 10:
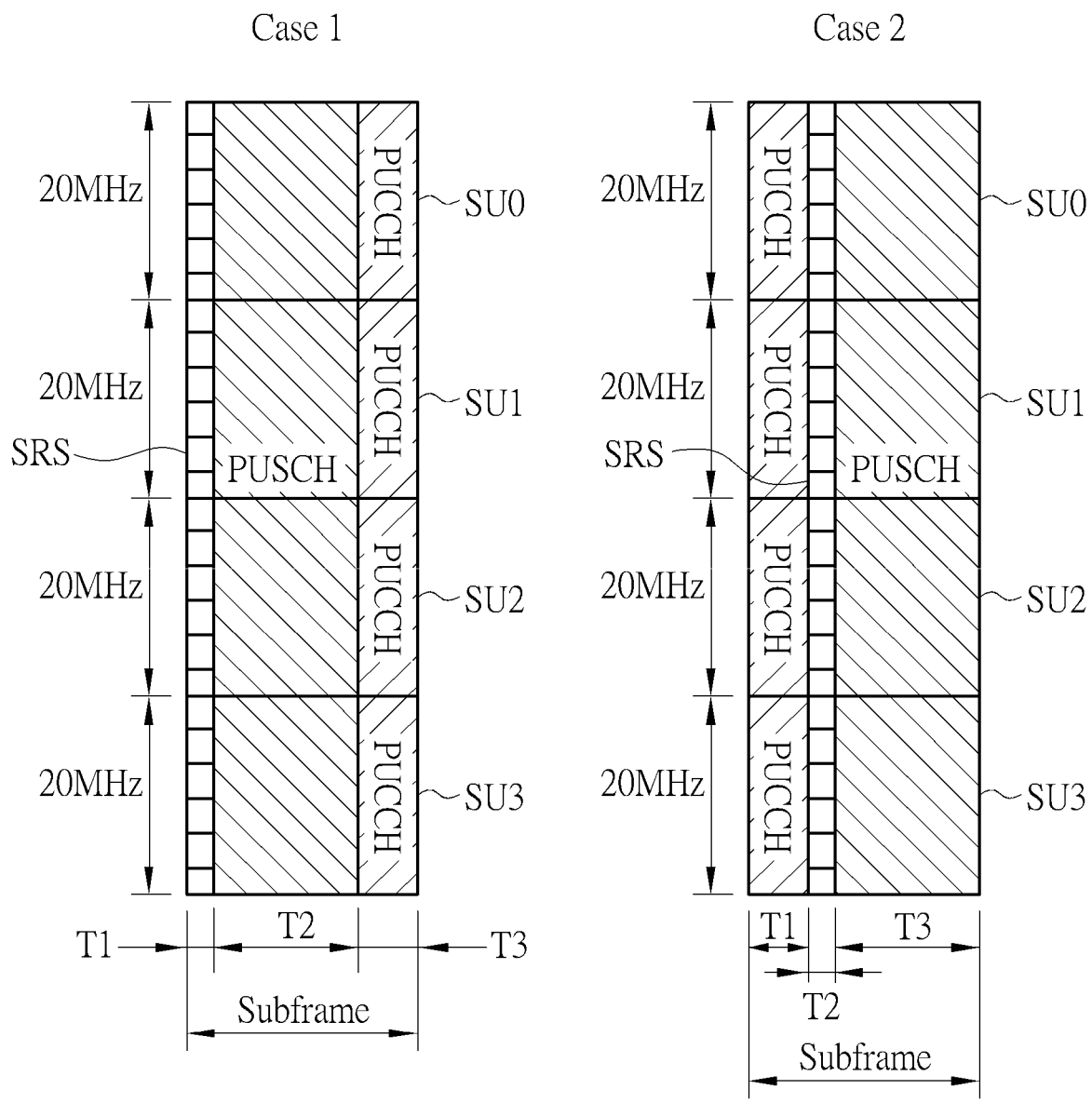
FIG. 10 is a schematic diagram of arrangement of subband units according to an example of the present invention.

FIG. 10 is a schematic diagram of arrangement of subband units according to an example of the present invention. There are 4 subband units SU0-SU3 in an unlicensed serving cell, a bandwidth of each of the subband units SU0-SU3 is 20 MHz, and a time width of each of the subband units SU0-SU3 is a subframe (or other time unit such as a time slot or a time interval, etc.). Two cases Case 1 and Case 2 are illustrated as follows. In Case 1, the communication device transmits a SRS in a time period T1 of one or more of the subband units SU0-SU3 in the subframe to the network. In addition, the communication device transmits a PUSCH in a time period T2 of one or more of the subband units SU0-SU3 in the subframe to the network. The communication device transmits a PUCCH in a time period T3 of one or more of the subband units SU0-SU3 in the subframe to the network. In Case 2, the communication device transmits a PUCCH in a time period T1 of one or more of the subband units SU0-SU3 in the subframe to the network. In addition, the communication device transmits a SRS in a time period T2 of one or more of the subband units SU0-SU3 in the subframe to the network. The communication device transmits a PUSCH in a time period T3 of one or more of the subband units SU0-SU3 in the subframe to the network. As can be seen, the SRS is transmitted before the PUSCH in the time domain in both cases. It should be noted that one or more of the subband units SU0-SU3 may not be used for transmitting the corresponding SRS, the corresponding PUSCH and/or the corresponding PUCCH, if a result of a LBT indicates that the one or more of the subband units SU1-SU3 is not clear. That is, the transmission(s) may be performed according to the result of the LBT performed in the subband unit(s).

Figure 11:
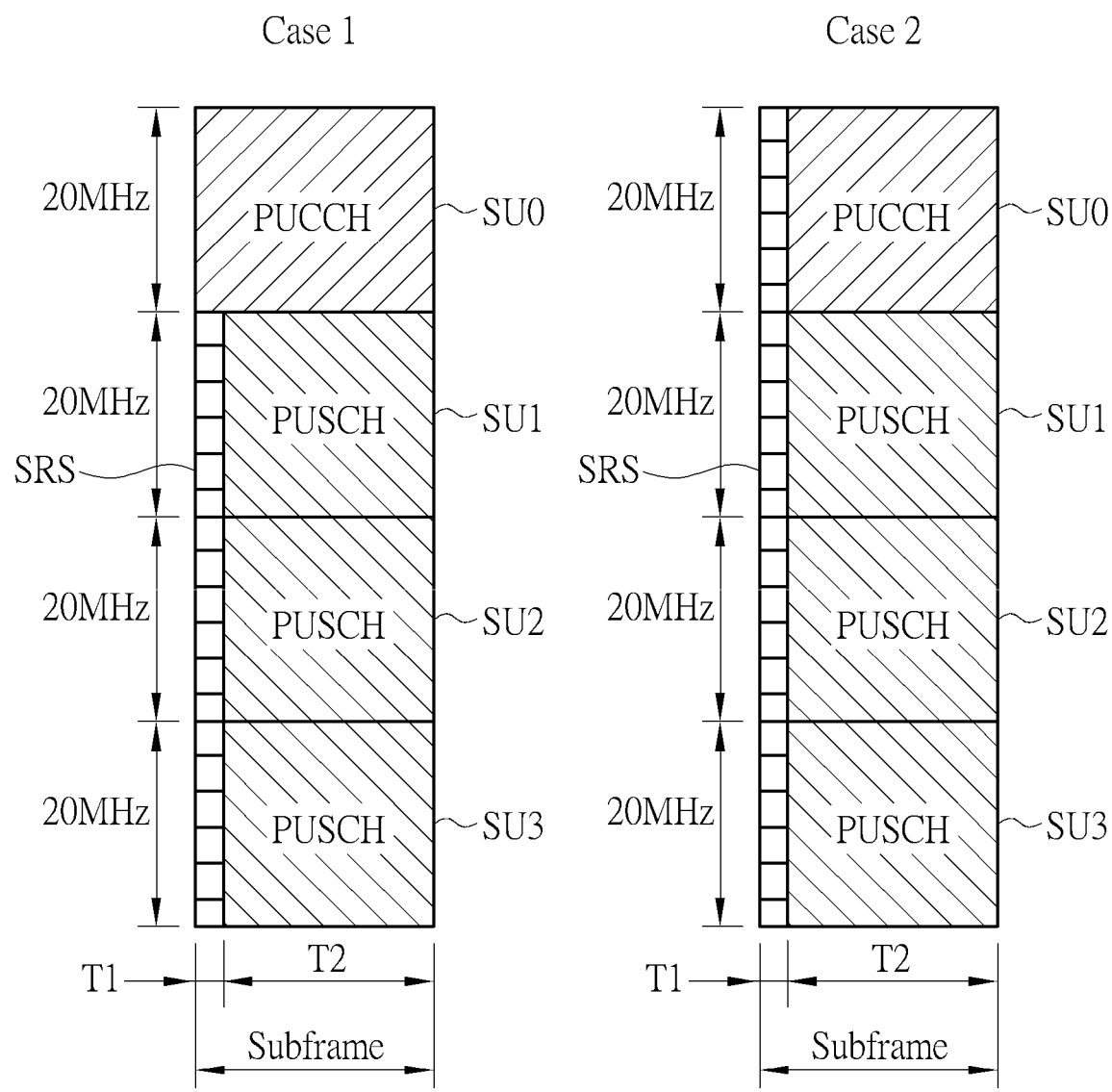
FIG. 11 is a schematic diagram of arrangement of subband units according to an example of the present invention.

FIG. 11 is a schematic diagram of arrangement of subband units according to an example of the present invention. There are 4 subband units SU0-SU3 in an unlicensed serving cell, a bandwidth of each of the subband units SU0-SU3 is 20 MHz, and a time width of each of the subband units SU0-SU3 is a subframe (or other time unit such as a time slot or a time interval, etc.). Two cases Case 1 and Case 2 are illustrated as follows. In Case 1, the subband unit SU0 is reserved for PUCCH(s), and the communication device can only transmit a SRS and a PUSCH in one or more of the subband units SU1-SU3. The communication device transmits a SRS in a time period T1 of one or more of the subband units SU1-SU3 in the subframe to the network. In addition, the communication device transmits a PUSCH in a time period T2 of one or more of the subband units SU1-SU3 in the subframe to the network. In Case 2, the communication device transmits a SRS in a time period T1 of one or more of the subband units SU0-SU3 in the subframe to the network. In addition, the communication device transmits a PUSCH in a time period T2 of one or more of the subband units SU1-SU3 in the subframe to the network. The communication device transmits a PUCCH in a time period T2 of the subband unit SU0 in the subframe to the network. That is, the PUCCH can only be transmitted in part of the subband unit SU0. As can be seen, the SRS is transmitted before the PUSCH in the time domain in both cases. It should be noted that one or more of the subband units SU0-SU3 may not be used for transmitting the corresponding SRS, the corresponding PUSCH and/or the corresponding PUCCH, if a result of a LBT indicates that the one or more of the subband units SU1-SU3 is not clear. That is, the transmission(s) may be performed according to the result of the LBT performed in the subband unit(s).

Figure 12:
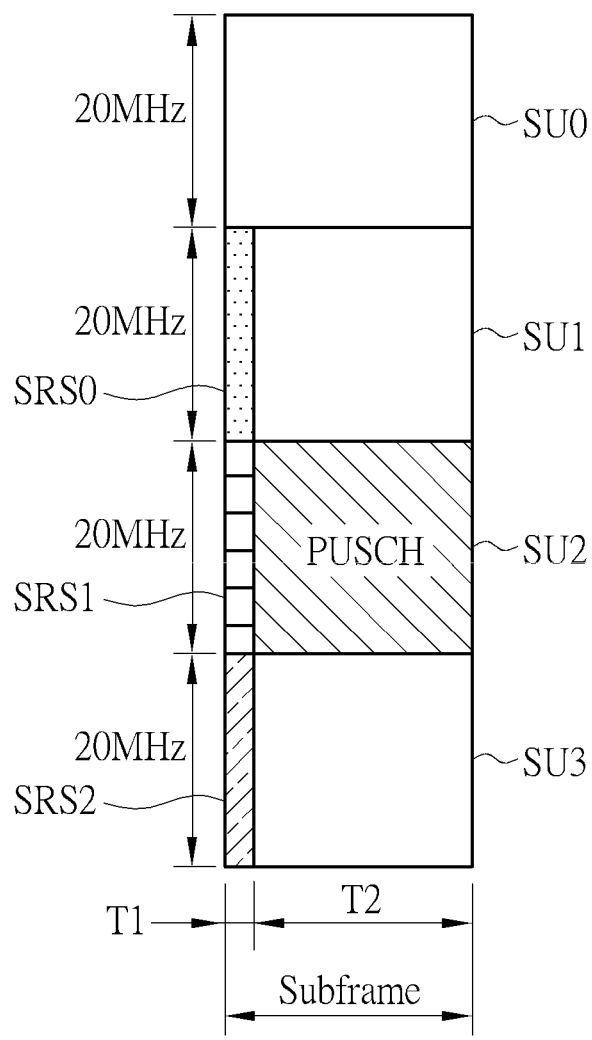
FIG. 12 is a schematic diagram of arrangement of subband units according to an example of the present invention.

FIG. 12 is a schematic diagram of arrangement of subband units according to an example of the present invention. There are 4 subband units SU0-SU3 in an unlicensed serving cell, a bandwidth of each of the subband units SU0-SU3 is 20 MHz, and a time width of each of the subband units SU0-SU3 is a subframe (or other time unit such as a time slot or a time interval, etc.). Three SRSs SRS0-SRS2 are scheduled to be transmitted via the subband units SU1-SU3, respectively. Each of the SRSs SRS0-SRS2 is a complete SRS, and is generated for a corresponding subband unit. For example, the SRS SRS1 is generated for the subband unit SU2. In the present example, the communication device transmits the SRSs SRS0-SRS2 in a time period T1 of the subband units SU1-SU3 in the subframe to the network. In addition, the communication device transmits a PUSCH in a time period T2 of the subband unit SU2 in the subframe to the network, wherein the time period T2 is after the time period T1. It should be noted that one or more of the subband units SU1-SU3 may not be used for transmitting the corresponding SRS and/or the corresponding PUSCH, if a result of a LBT indicates that the one or more of the subband units SU1-SU3 is not clear. That is, the transmission(s) may be performed according to the result of the LBT performed in the subband unit(s). In this situation, the network can still receive the SRS(s) correctly, because the SRS(s) is generated separately for the corresponding subband unit(s).

It should be noted that a subband unit may be named as an unlicensed subband unit, a LAA subband unit, a resource group, an unlicensed resource group, a LAA resource group, a PRB group, an unlicensed PRB group, a LAA PRB group, and is not limited herein. A bandwidth of a subband unit may be 2.5 MHz, 3 MHz, 4 MHz, etc. A time width of the subband unit may be one or more subframes, one or more time slots, or one or more time intervals. In addition, the features and/or the operations of a communication device mentioned above may imply corresponding features and/or operations of the network, but is not limited herein.

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20.

Examples of the hardware may include analog circuit(s), digital circuit(s) and/or mixed circuit(s). For example, the hardware may include ASIC(s), field programmable gate array(s) (FPGA(s)), programmable logic device(s), coupled hardware components or combination thereof. In another example, the hardware may include general-purpose processor(s), microprocessor(s), controller(s), digital signal processor(s) (DSP(s)) or combination thereof.

Examples of the software may include set(s) of codes, set(s) of instructions and/or set(s) of functions retained (e.g., stored) in a storage unit, e.g., a computer-readable medium. The computer-readable medium may include SIM, ROM, flash memory, RAM, CD-ROM/DVD-ROM/BD-ROM, magnetic tape, hard disk, optical data storage device, non-volatile storage unit, or combination thereof. The computer-readable medium (e.g., storage unit) may be coupled to at least one processor internally (e.g., integrated) or externally (e.g., separated). The at least one processor which may include one or more modules may (e.g., be configured to) execute the software in the computer-readable medium. The set(s) of codes, the set(s) of instructions and/or the set(s) of functions may cause the at least one processor, the module(s), the hardware and/or the electronic system to perform the related steps.

Examples of the electronic system may include a system on chip (SoC), system in package (SiP), a computer on module (CoM), a computer program product, an apparatus, a mobile phone, a laptop, a tablet computer, an electronic book or a portable computer system, and the communication device 20.

To sum up, the present invention provides device and a method for handling transmission/reception for a serving cell. A communication device may perform a LBT and a measurement simultaneously in the same or different sub-band unit(s), to accelerate the completeness of control-related procedures. Thus, efficiency of the communication between the communication device and the network is improved. In addition, a method for transmitting a SRS, a PUCCH and/or a PUSCH is provided for the serving cell. Thus, the problem of transmitting the UCI via the serving cell is solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for handling transmission/reception for a serving cell, comprising:
   a storage unit, for storing instructions of:
   receiving an indication indicating at least one physical resource block (PRB) group of a plurality of PRB groups of a serving cell from a network, wherein at least one location and at least one bandwidth of the at least one PRB group are configured by a higher layer signaling transmitted by the network; and
   performing a communication operation in the at least one PRB group with the network, after receiving the indication;
   wherein each of the plurality of PRB groups comprises at least one physical uplink (UL) control channel (PUCCH) resource;
   wherein each of the at least one PUCCH resource indicates a starting symbol index and a duration of a PUCCH;
   wherein the communication operation comprises transmitting a UCI and a demodulation reference signal (DMRS) with a PUCCH format in a PUCCH and a physical UL shared channel (PUSCH) in one of the at least one PRB group, the PUCCH and the PUSCH are transmitted according to a time-division multiplexing (TDM) scheme, and the PUCCH is transmitted according a code-division multiplexing (CDM) scheme; and
   a processing circuit, coupled to the storage unit, configured to execute the instructions stored in the storage unit.

2. The communication device of claim 1, wherein the communication operation comprises a listen before talk (LBT) performed in a first set of the at least one PRB group.

3. The communication device of claim 2, wherein the storage unit further stores the instruction of:
   transmitting at least one of data and control information via the first set of the at least one PRB group to the network according a result of the LBT.

4. The communication device of claim 1, wherein the communication operation comprises a measurement performed in a second set of the at least one PRB group.

5. The communication device of claim 4, wherein the storage unit further stores the instructions of:
   performing a LBT in a third set of the at least one PRB group; and
   transmitting a measurement result of the measurement via the third set of the at least one PRB group according to a result of the LBT.

6. The communication device of claim 5, wherein the measurement result comprises a LBT successful rate of the third set of the at least one PRB group.

7. The communication device of claim 1, wherein the at least one location or the at least one bandwidth of the at least one PRB group is determined according to a bandwidth of the serving cell.

8. The communication device of claim 1, wherein each of the at least one PRB group comprises a plurality of consecutive PRBs.

9. The communication device of claim 1, wherein a maximum number of the plurality of PRB groups is 4.

10. The communication device of claim 1, wherein the plurality of PRB groups are not overlapped, partly overlapped or completely overlapped.

11. The communication device of claim 1, wherein the communication operation comprises:
    transmitting the physical UL shared channel (PUSCH) in the at least one PRB group of the serving cell to the network.

12. The communication device of claim 1, wherein the duration of the PUCCH is a long duration or a short duration.

* * * * *